(12) United States Patent
Golov (10) Patent No.: US 11,954,051 B2
(45) Date of Patent: Apr. 9, 2024

(54) MANAGED NAND FLASH MEMORY REGION CONTROL AGAINST ENDURANCE HACKING

(71) Applicant: Micron Technology, Inc., Boise, ID (US)

(72) Inventor: Gil Golov, Backnang (DE)

(73) Assignee: Lodestar Licensing Group LLC, Evanston, IL (US)

( * ) Notice: Subject to any disclaimer, the term of this patent is extended or adjusted under 35 U.S.C. 154(b) by 0 days.

(21) Appl. No.: 17/897,656

(22) Filed: Aug. 29, 2022

(65) Prior Publication Data

US 2022/0414031 A1 Dec. 29, 2022

Related U.S. Application Data

(63) Continuation of application No. 17/077,503, filed on Oct. 22, 2020, now Pat. No. 11,429,543.

(51) Int. Cl.
| | |
|---|---|
| *G06F 13/40* | (2006.01) |
| *G06F 9/455* | (2018.01) |
| *G06F 12/02* | (2006.01) |
| *G06F 12/06* | (2006.01) |
| *G06F 12/0873* | (2016.01) |
| *G06F 13/16* | (2006.01) |
| *G06F 13/42* | (2006.01) |

(52) U.S. Cl.
CPC ...... *G06F 13/1668* (2013.01); *G06F 9/45558* (2013.01); *G06F 12/0246* (2013.01); *G06F 12/0646* (2013.01); *G06F 12/0873* (2013.01); *G06F 13/4221* (2013.01); *G06F 2009/45562* (2013.01); *G06F 2009/45583* (2013.01); *G06F 2213/0026* (2013.01)

(58) Field of Classification Search
CPC .. G06F 12/0246; G06F 3/0679; G06F 3/0619; G06F 3/064; G06F 3/0659; G06F 3/061
USPC .......................................................... 711/154
See application file for complete search history.

(56) References Cited

U.S. PATENT DOCUMENTS

| | | | | |
|---|---|---|---|---|
| 9,600,184 | B2 * | 3/2017 | Flynn | .................... G06F 3/067 |
| 9,792,045 | B1 * | 10/2017 | Miller | .................. G06F 3/0683 |
| 11,429,543 | B2 | 8/2022 | Golov | |
| 2002/0184432 | A1 * | 12/2002 | Ban | .................... G06F 12/0246 |
| | | | | 711/E12.008 |
| 2004/0083335 | A1 * | 4/2004 | Gonzalez | ............ G06F 12/0246 |
| | | | | 711/159 |
| 2010/0030948 | A1 * | 2/2010 | Moon | .................. G06F 12/0246 |
| | | | | 711/E12.001 |

(Continued)

*Primary Examiner* — Titus Wong
(74) *Attorney, Agent, or Firm* — Greenberg Traurig (57) ABSTRACT

The disclosed embodiments are directed to improving the lifespan of a memory device. In one embodiment, a system is disclosed comprising: a host processor and a memory device, wherein the host processor is configured to receive a write command from a virtual machine, identify a region identifier associated with the virtual machine, augment the write command with the region identifier, and issue the write command to the memory device, and the memory device is configured to receive the write command, identify a region comprising a subset of addresses writable by the memory device using a region configuration table, and write the data to an address in the subset of addresses.

20 Claims, 5 Drawing Sheets

(56) References Cited

U.S. PATENT DOCUMENTS

| | | | | |
|---|---|---|---|---|
| 2011/0107016 A1* | 5/2011 | Kim | ............... | G06F 12/0246 |
| | | | | 711/E12.008 |
| 2012/0284587 A1* | 11/2012 | Yu | ............... | G06F 12/0868 |
| | | | | 711/E12.008 |
| 2013/0145085 A1* | 6/2013 | Yu | ............... | G06F 12/0246 |
| | | | | 711/103 |
| 2014/0215129 A1* | 7/2014 | Kuzmin | ............... | G06F 12/0246 |
| | | | | 711/103 |
| 2014/0281040 A1* | 9/2014 | Liu | ............... | G06F 9/50 |
| | | | | 710/3 |
| 2016/0124649 A1* | 5/2016 | Liu | ............... | G06F 3/061 |
| | | | | 711/103 |
| 2016/0132443 A1* | 5/2016 | Davda | ............... | G06F 9/45558 |
| | | | | 710/308 |
| 2016/0170846 A1* | 6/2016 | Hands | ............... | G06F 11/1662 |
| | | | | 714/6.3 |
| 2016/0292007 A1* | 10/2016 | Ding | ............... | G06F 9/5077 |
| 2016/0293207 A1* | 10/2016 | Fukuhisa | ............... | G06F 3/064 |
| 2022/0129394 A1 | 4/2022 | Golov | | |

* cited by examiner

MANAGED NAND FLASH MEMORY REGION CONTROL AGAINST ENDURANCE HACKING

RELATED APPLICATIONS

The present application is a continuation application of U.S. patent application Ser. No. 17/077,503, filed Oct. 22, 2020, issued as U.S. Pat. No. 11,429,543 on Aug. 30, 2022, the entire disclosure of which application is hereby incorporated herein by reference.

FIELD OF THE TECHNOLOGY

At least some embodiments disclosed herein relate generally to semiconductor devices and, in particular, to improving the security of Flash memory devices.

BACKGROUND

A Flash memory device stores data in an array of cells, each cell comprising one or more transistor elements storing electrical charge representing bits of the data. The underlying physical properties of the transistor cause each cell to support a fixed number, or range, of operations affecting the contents of the cell. The number of times a memory cell can be programmed to or erased before malfunctioning is referred to as the endurance of a memory cell.

To improve the lifespan of a Flash memory device, these devices generally utilize wear leveling to "spread" program/erase (P/E) cycles across all cells. Specifically, wear leveling routines implemented by Flash memory controllers arrange data so that erasures and re-writes are distributed evenly across the memory cells. Controllers implement this re-arranging by distributing physical block address (PBA) values allocated for logical block address (LSA) values. As a result, each memory cell is theoretically programmed and erased evenly, and no single cell fails faster than another.

Despite the use of wear leveling routines, memory devices such as NAND Flash devices are still subject to expedited endurance failures due to malicious or poorly written software that rapidly "uses up" a memory array's P/E cycles.

DETAILED DESCRIPTION

As described in the Background, wear leveling "spreads" P/E cycles across all cells of a memory array. However, malicious or poorly implemented software may render wear leveling of minimal value in preserving P/E cycles. Specifically, such software may write excessive amounts of data to the memory array. In response, the memory controller will attempt to distribute the P/E cycles across all memory cells. However, the sheer volume of writes may result in some, most, or all memory cells reaching is maximum endurance and cause such cells to fail. When enough data is written, the software can effectively destroy a memory device (e.g., a solid-state device or SSD).

In some cases, this result is unintentionally caused. For example, logging software may not include any trigger to stop logging, even when unexpected amounts of data are received. In other cases, the result is intentionally and maliciously caused. For example, a malicious user may launch a program to intentionally write many petabytes of data to an SSD specifically to cause the memory cells to reach their endurance threshold. In yet another case, a combination of malicious actions and poorly implemented software may cause the result. For example, a malicious user may exploit a poorly designed logging application by submitting many requests, causing the application to write petabytes of data (similar to a denial of service attack).

Such scenarios frequently occur when multiple virtual machine (VM) instances are running on a single host processor and accessing a memory device (e.g., an SSD). For example, cloud computing platforms often host many VMs operated by disparate entities. These VMs may access a single, large SSD to provide persistent storage. Since the VMs are isolated, a portion of an SSD used by a non-malicious VM operator may be negatively impacted by a malicious (or negligent) VM operator, as described above.

Figure 1:
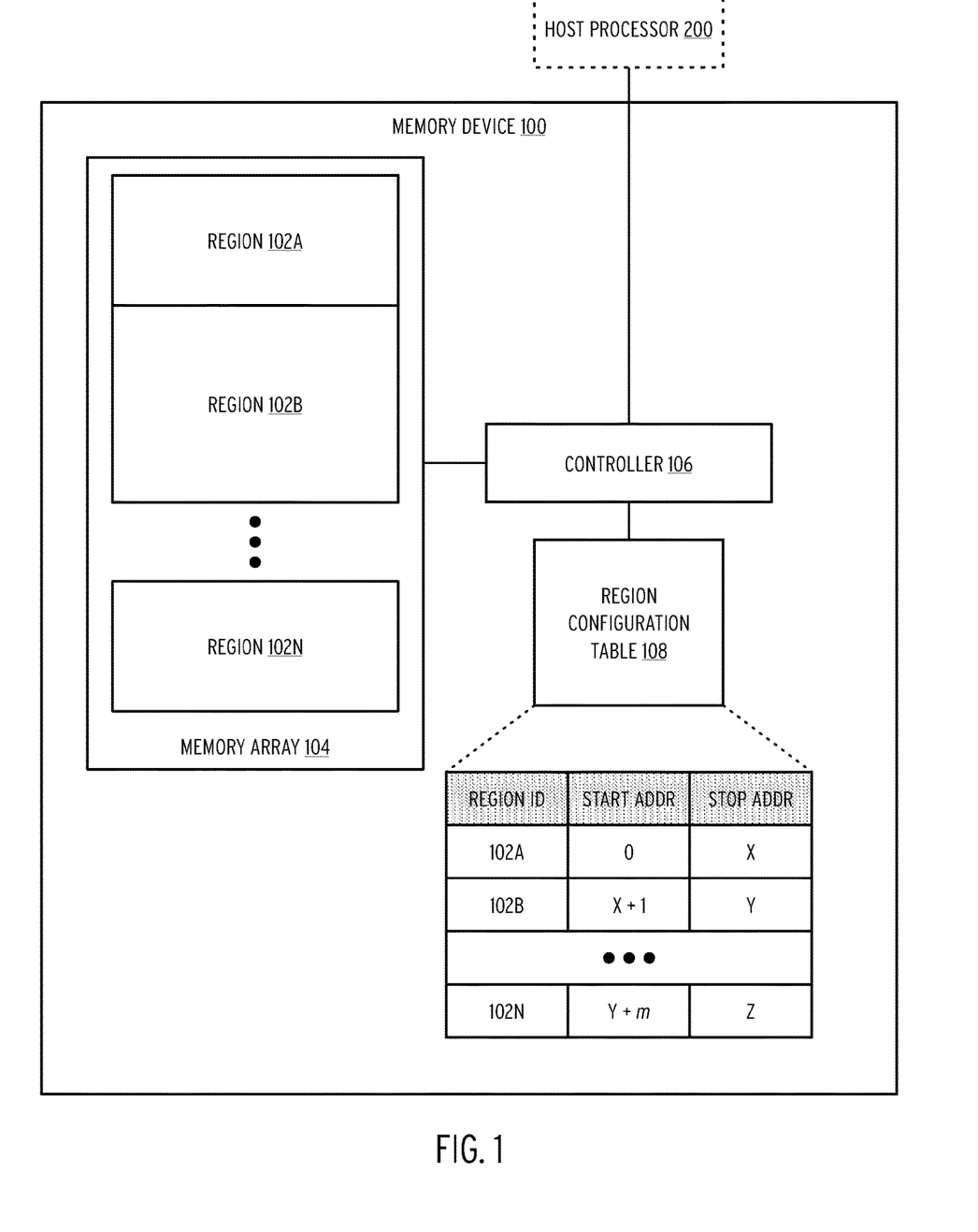
FIG. 1 is a block diagram of a memory device according to some embodiments of the disclosure.

FIG. 1 is a block diagram of a memory device according to some embodiments of the disclosure.

In the illustrated embodiment, the memory device (100) may comprise a NAND Flash memory device. In one embodiment, the memory device (100) may comprise an SSD or other type of storage device that utilizes NAND Flash memory. In other embodiments, NOR Flash memory may be used in lieu of NAND Flash memory. The following description primarily discusses NAND Flash memory; however, other memory types may be used. In some embodiments, any memory type may be used that utilizes wear leveling (or other techniques) to increase write endurance of individual memory cells.

In the illustrated embodiment, the memory device (100) is communicatively coupled to a host processor (200). Host processor (200) is discussed more fully in the description of FIG. 2, which is incorporated herein in its entirety. In brief, host processor (200) may comprise any computer processor or computing system. For example, host processor (200) may comprise a central processing unit (CPU) executing one or more virtual machine instances. In this example, the CPU may communicate with the memory device (100) over a local bus (e.g., a Peripheral Component Interconnect Express, PCIe, bus).

In another example, host processor (200) may comprise a server computer including its own volatile memory and other peripheral devices. In this example, the server computer may communicate with the memory device (100) over a network. That is, the memory device (100) may comprise a network-attached store (NAS) device.

In general, any computing device capable of issuing commands to a storage device may be used as the host processor, and the disclosure places no limitation on the particular form of the host processor (200). As will be discussed in more detail in FIG. 2, the host processor (200) includes one or more configuration tables to manage access to the memory device (100). Further, the host processor (200) is configured to issue an augmented write command based on such configuration tables. Host processor (200) may additionally be capable of issuing other operations (e.g., read operations) but those commands are not described in detail herein and existing operations may be used as will be discussed.

The memory device (100) includes a controller (106). In the illustrated embodiment, the controller (106) mediates all operations transmitted by the host processor (200) and any other devices. In one embodiment, the controller (106) comprises a microcontroller or computer processor. In other embodiments, the controller (106) may comprise a system-on-a-chip (SoC). In general, controller (106) includes all logic necessary for accessing the memory array (104). Exemplary components of the controller (106) are described in FIG. 5 and are not repeated herein.

As will be discussed, the controller (106) receives requests to inter alia read and write data to memory array (104). In the illustrated embodiment, the memory array (104) may comprise an address space of physical memory cells addressable by controller (106). The specific geometric arrangement of memory array (104) is not limiting and for ease of discussions is presented as an array of physical addresses.

The controller (106) may include LSA-PSA mapping logic to map LBAs in read/write commands to PBAs representing addresses in the memory array (104). For each read/write command, the controller (106) will generate a corresponding LSA located in the array (104). For read operations, the controller (106) may utilize an LSA-PSA lookup table to identify the corresponding PBA. This lookup table may be populated when writing data. That is, after a successful write to a PBA, the controller (106) updates the LSA-PSA lookup table with the LSA and PBA values for later reads.

In contrast, for write commands, the controller (106) may utilize a region configuration table (108) to generate a PBA. As illustrated, the memory array (102) includes a plurality of regions (102a . . . 102n). The specific sizes and numbers of these regions (102a . . . 102n) is not limiting. In general, a given region (102a . . . 102n) comprises a sequential set of PBAs. The sizes may be constant or may be changeable (i.e., dynamically expanded/contracted). The regions (102a . . . 102n) may comprise logical regions and may not comprise physically distinct areas of memory. In other embodiments, a memory array (104) may comprise multiple physically distinct structures corresponding to each region. For example, each region (102a . . . 102n) may correspond to a NAND Flash memory plane.

The configuration table (108) stores a mapping of fixed region identifiers to addresses of the regions (102a . . . 102n). In the illustrated embodiment, each of the regions (102a . . . 102n) is associated with a physical start address and a physical stop address that defines its bounds. Thus, a first region (102a) includes all physical addresses between 0 and X, a second region (102b) includes all physical addresses between X+1 and Y, and an nth region (102n) includes all physical addresses between Y+m and Z, where m comprises one more than the number of addresses between the end of region 2 (102b) and the beginning of region n (102n). As an example, if the number of regions in FIG. 1 was three, the value of Y+m would equal Y+1. In an alternative embodiment, the table (108) may only include a start address and a region size (i.e., the number of addresses in the region) wherein a stop address can be calculated.

Figure 4:
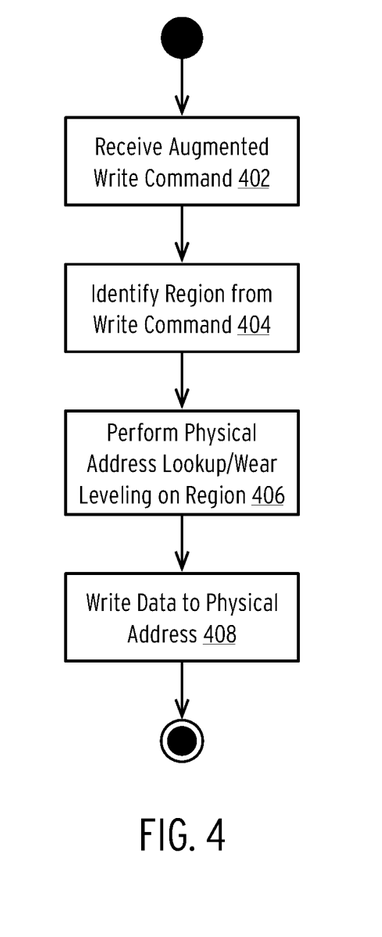
FIG. 4 is a flow diagram of a method for processing a write command and preventing endurance hacking according to some embodiments of the disclosure.

As discussed, and discussed in more detail in FIG. 4, the controller (106) uses the table (108) when processing write commands. Specifically, when a host processor (200) issues a write command, the host processor (200) includes a region identifier (ID) in the write command. A write (or program) operation that includes a region ID is referred to as an "augmented" write command to distinguish such an operation from a standard write command. The write command additionally includes an LBA and data to write. In one embodiment, the LBA in an augmented command is always selected from a range of LBAs values starting from zero. That is, in the illustrated table (108), the LBAs for region 0 (102a) are between 0 and X, the LBAs for region 1 (102b) are between 0 and Y–X, etc. In this embodiment, each region (102a . . . 102n) has its own zero-indexed address space. Alternatively, in some embodiments, the LBAs in the write command may comprise any LBA in the range 0 . . . Z in table (108). In one embodiment, the latter implementation may be used to improve compatibility with previous NAND controllers/arrays.

The controller (106) processes the write command by extracting the region ID from the write command and generating a PBA included in the range identified using the start and stop addresses in the table (108). In one embodiment, the generation of a PBA is performed by dedicated wear-leveling logic (not illustrated) in the controller (106). In contrast to existing wear-leveling routines, the controller (106) implements a scoped wear-leveling routine. In this scoped routine, the wear-leveling is only performed on the addresses in a given region. Specific details of how to manage and record wear-levels is not included herein any existing routine may be used, provided it is scoped as described herein.

As an example, the write command may specify region 0 and an LSA of 0x01. The value of X in the table (108) may be 255 (0xFF). The controller (106) identifies the range of available PBAs (0x00-0xFF) and selects a free PBA (e.g., 0x2E) from the range. In one embodiment, the controller (106) may use an LSA-PSA mapping for the region to identify an available PBA and may identify the PBA based on finding a PBA having the fewest P/E operations (i.e., wear-leveling).

After identifying a PBA as described above, the controller (106) writes the data in the augmented write command to the PBA and returns a success result to the host processor (200). Thus, in contrast to existing memory devices, the PBA selection is scoped to a given region and when an augmented write command is received, only PBAs in a region may be written to. In this manner, even if a host processor (200) were to write an excessive amount of data (e.g., 100,000*X writes to region 102a), only those cells in the region would fail while the other regions (e.g., 102b, 102n) would not be affected. In this manner, malicious or poorly programmed software on the host processor (especially a multi-tenanted processor) cannot negatively impact the entire shared memory device (100).

Finally, in some embodiments, the controller (106) processes read operations normally. Specifically, the host processor (200) will subsequently issue a read operation that includes the LSA requested in the write command. In some embodiments, the controller (106) maintains a global LSA-PSA lookup table to process read operations and thus identifies the PBA, reads, and returns the data. Alternatively, if the regions are zero-indexed, the controller (106) may store per-region LSA-PSA tables. In this alternative, the read operation will include a region ID and the controller (106) will load the corresponding scoped region LSA-PSA table to perform the PBA mapping. The controller (106) then reads the data from the identified PBA normally and returns the read value.

As described above, the host processor (200) ultimately augments write commands with region IDs. In some embodiments, the host processor (200) includes a hypervisor that intercepts standard write commands and inserts a region ID based on a mapping (e.g., a VM-region mapping). Further details on this aspect of the embodiments are described more fully in the following Figures.

Figure 2:
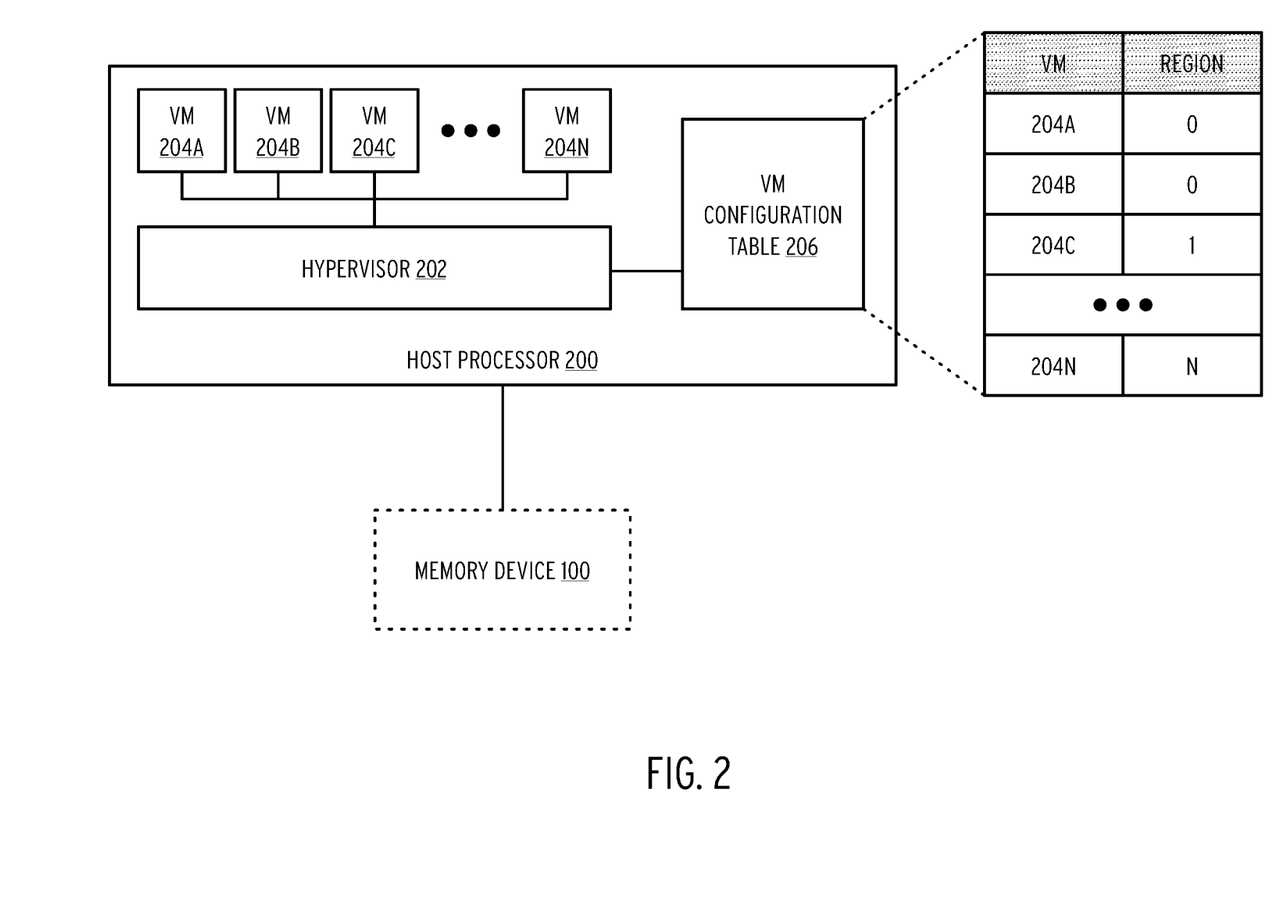
FIG. 2 is a block diagram of a host processor according to some embodiments of the disclosure.

FIG. 2 is a block diagram of a host processor according to some embodiments of the disclosure.

In the illustrated embodiment, a memory device (100) is communicatively coupled to a host processor (200). Host processor (200) may comprise any computer processor or computing system. For example, host processor (200) may comprise a central processing unit (CPU) executing one or more virtual machine instances. In this example, the CPU may communicate with the memory device (100) over a local bus (e.g., a Peripheral Component Interconnect Express, PCIe, bus).

In another example, host processor (200) may comprise a server computer including its own volatile memory and other peripheral devices. In this example, the server computer may communicate with the memory device (100) over a network. That is, the memory device (100) may comprise a network-attached store (NAS) device.

The host processor (200) is configured to issue an augmented write command based on such configuration tables. Host processor (200) may additionally be capable of issuing other operations (e.g., read operations) but those commands are not described in detail herein and existing operations may be used as will be discussed.

In the illustrated embodiment, the host processor (200) includes a hypervisor (202). In the illustrated embodiment, the hypervisor (202) comprises computer software, firmware or hardware that creates and runs virtual machines including VMs (204a-204n). Hypervisor (202) enables the VMs (204a-204n) to share the available resources (e.g., CPU, volatile memory, and access to memory device 100) and provide greater mobility since the VMs (204a-204n) are independent of the hardware of the host processor (200).

In the illustrated embodiment, each VM (204a-204n) executes one or more applications. No limit is placed on the types of applications that run on VMs (204a-204n). For example, one VM (204a) may implement a full operating system (OS) and one or more user-level applications executing thereon. In another embodiment, containers or other virtualization techniques may be used in lieu of and in combination with VMs. For example, VM (204b) may instead be a Docker® container or Kubernetes pod. Other virtualization or container technologies may be used. In general though, each of the VMs (204a-204n) is capable of accessing the memory device (100) to store and read data. As described in FIG. 1, in some embodiments, memory device (100) comprises an SSD and thus comprises a non-volatile storage device connected to the host processor (200) for storage of data by applications running on VMs (204a-204n).

In the illustrated embodiment, each VM (204a-204n) can access the memory device (100). Further, communications between VMs (204a-204n) and the memory device (100) are mediated by the hypervisor (202). Thus, if a given VM (204a-204n) accesses the memory device (100), that access is intercepted by the hypervisor (202). In one embodiment, each VM (204a-204n) issues standardized commands to access the memory device (100). For example, each VM (204a-204n) may issue standard POSIX (Portable Operating System Interface) commands to access an SSD that comprises the memory device (100). Hypervisor (202) receives these commands and forwards the commands as operations to the memory device (100).

In the illustrated embodiment, the hypervisor (202) maintains a VM configuration table (206). In the illustrated embodiment, the table (206) comprises a mapping of the VMs (204a-204n) to regions of the memory device (100). As illustrated, the table (206) specifically maps VM (204a-204n) identifiers to region IDs. In some embodiments, each VM (204a-204n) maps to a distinct region of the memory device (100). However, as illustrated, in some embodiments, multiple VMs (204a, 204b) may map to the same region ID.

Figure 3:
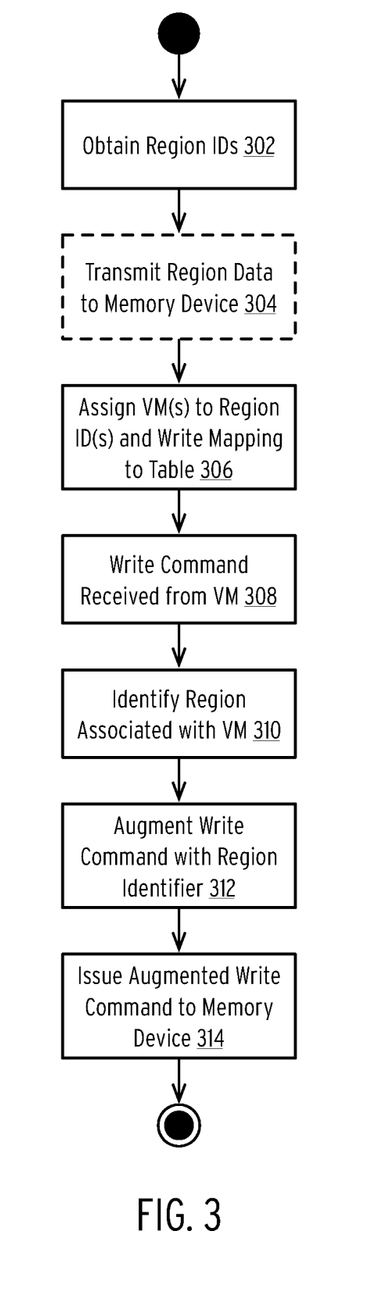
FIG. 3 is a flow diagram of a method for preventing endurance hacking according to some embodiments of the disclosure.

In one embodiment, described in more detail in FIG. 3, the hypervisor (202) retrieves or creates a list of available region IDs for use by the memory device (100). Specifically, in one embodiment, the memory device (100) manages its own regions and thus the hypervisor (202) will retrieve a list of region IDs and metadata (e.g., sizes etc.) from the memory device (100). In another embodiment, the hypervisor (202) may manage the allocation of regions in the memory device (100). In this embodiment, the hypervisor (202) may initialize a first number of regions when starting up and transmit an instruction to the memory device (100) to populate a region configuration table (108) based on the desired number and size of the regions. In one embodiment, the hypervisor (202) continuously manages the region configuration table (108) based on the allocation of VMs (204a-204n). Thus, on startup, the hypervisor (202) may initialize a single region (0) and launch a first VM. When a second VM is requested, the hypervisor (202) may "shrink" the first region (0) and add a new region (1) to accommodate the second VM, etc.

As illustrated, in both embodiments above, the hypervisor (202) also maintains a table mapping VMs (204a-204n) to region IDs. In one embodiment, the hypervisor (202) maintains a list of available region IDs identified from the memory device (100) and allocates unused region IDs to new VMs, as well as reclaims region IDs from terminated VMs. In another embodiment, the hypervisor (202) may simultaneously create a new region in the memory device (100) when a VM is launched and automatically associate the new VM with the new region in table (206). In the illustrated embodiment, the table (206) may be stored in volatile memory connected to the host processor (or in on-board volatile memory if available) and persisted to disk to enable resuming a VM. In one embodiment, the host processor (200) persists the table (206) to a dedicated region (not illustrated) of memory device (100) prior to shutting down.

FIGS. 3 and 4 provide further detail regarding the operations of host processor (200) and memory device (100). The details of these operations are incorporated in FIGS. 1 and 2, as appropriate.

FIG. 3 is a flow diagram of a method for preventing endurance hacking according to some embodiments of the disclosure. In one embodiment, the method illustrated in FIG. 3 may be executed by a host processor and, in some embodiments, a hypervisor executing on a host processor.

In block 302, the method obtains a list of region IDs. In the illustrated embodiment, a hypervisor executes block 302 upon startup.

In a first embodiment, the method obtains a list of region IDs by querying a memory device. In this embodiment, when the memory device starts up, a plurality of regions are created and stored in a region configuration table. In one embodiment, the memory device creates a fixed set of equally-sized regions and stores the region details in the table. Then, when a hypervisor is initialized it issues a command to read the region IDs from the memory device and thus obtains the region IDs.

In a second embodiment, the method obtains a list of region IDs by generating the region IDs. In this embodiment, the method may query the memory device to determine an available capacity of an underlying memory array. Based on the capacity, the method divides the total capacity into one or more regions. The method may determine the number of regions randomly, as one, or by any other means (e.g., the number of VMs to initialize). The method thus obtains the list of region IDs locally and controls the initial allocation of regions on the memory device.

If the first embodiment is implemented, the method may proceed to block 306. If the second embodiment is implemented, the method executes block 304. In block 304, the method transmits region data to the memory device. In one embodiment, the method transmits the number of regions requested to the memory device. In response, the memory device may divide the memory array into the number of requested regions. In one embodiment, the memory device may divide the size evenly among the requested regions.

In a second embodiment, the method may transmit the number of regions requested as well as a desired size for one or more regions. For example, the method may request two regions having sizes of 1 GB and 2 GB. As another example, the method may request three regions having 30%, 20%, and 50% of the available capacity. Various other methods may be used. In response, the memory device attempts to allocate each region. The allocation of each region comprises writing a start address and stop address to a region configuration table stored in the memory device. In one embodiment, the memory device may determine if the request is valid. For instance, the memory device may determine if the requested capacity (if using raw capacity) is available for use (or exists). If percentages are used, the memory device may confirm that the total percentage requested is less than or equal to 100%. The memory device may then proceed to allocate the regions sequentially by computing a start and stop address for each region and writing these addresses to the region configuration table. For instance, if two regions are requested at 50% capacity each, the method writes region 0 with start address 0x0 and stop address of 0xN/2 where N is the available capacity of the memory array. The memory device then writes the next region to the table having a start address of 0x(N/2+1) and ending address of 0xN. The memory device continues to process each region until all regions have been recorded in the table. Notably, in some embodiments, the memory device will not modify the underlying physical storage and manages regions entirely using the local table.

In some embodiments, if block 304 is implemented, the memory device will return the region identifiers generated during the above process. In this scenario, when executing block 302, the host processor does not assign identifiers to the regions but instead awaits the memory device's assignment of identifiers. In this manner, the requested regions and returned region identifiers may not be in a consistently ordered format. That is, the host processor may request regions A, B, and C but the memory device may assign A=3, B=1, and C=2 (as compared to assigning A=1, B=2, C=3). Due to this potential "re-ordering", the method may await confirmation of identifiers before proceeding to block 306.

In block 306, the method assigns one or more VMs to respective region identifiers. In some embodiments, the method maps each VM to a distinct region of the memory device. However, in some embodiments, the method may map multiple VMs to the same region ID. In some embodiments, the selection of region IDs is random. In other embodiments, the method orders the region IDs and maps the region IDs from lowest to highest (or vice-versa). After assigning each VM to a region ID, the method writes this mapping to a VM configuration table (206).

In block 308, the method receives a write command from a VM. In the illustrated embodiment, the write command comprises a command to write data to a memory device such as an SSD. In the illustrated embodiment, each VM can issue commands to access an underlying storage medium without knowledge of the underlying implementation of the memory device. Thus, standard system calls may be used to issue write commands. As described above, in some embodiments the method is executed by a hypervisor, thus the method intercepts write commands issued by each VM in block 308. In some embodiments, the write command includes an LSA and data to be written.

In block 310, the method identifies a region associated with the VM. In illustrated embodiment, the method can associate each write command with a specific VM. In some embodiments, each VM is associated with a unique identifier known to the method (e.g., known to a hypervisor executing the method). Thus, when the hypervisor receives a write command it can identify the VM identifier associated with the VM that issued the write command.

Next, the method queries a table that maps VM identifiers to region identifiers. This table is described in connection with the table (206) of FIG. 2 and that description is not repeated herein. Upon querying the table, the method thus identifies a region identifier for the VM that issued the right command.

In block 312, the method augments the write command with the region identifier. In one embodiment, the method adds the region identifier to a configuration section of the write command. In another embodiment the method may issue a separate command that includes the region identifier. That is, the method may convert a standard write command to a dedicated write command that is handled by a different logic of the memory device firmware. In either scenario, the method includes the write address (e.g., LSA) and data along with the region identifier.

In block 314, the method issues the augmented write command to the memory device. As discussed above, the method in FIG. 3 may be performed by a host processor and, in some embodiments, a hypervisor. Thus, in block 314, the device executing the method issues the command to the memory device over an appropriate interface. This interface may comprise an internal bus (e.g., PCIe bus) or a network and the specific interconnect is not limiting. As will be described in more detail in connection with FIG. 4, the memory device receives the augmented write command specially processes the write based on the region ID.

FIG. 4 is a flow diagram of a method for processing a write command and preventing endurance hacking according to some embodiments of the disclosure.

In step 402, the method receives an augmented write command.

In the illustrated embodiment, the augmented write command comprises the write command generated by the process described in FIG. 3 and that disclosure is incorporated herein in its entirety. In some embodiments, the method of FIG. 4 is performed by a memory device such as an SSD and, in particular, a controller of such a device. As described above, the augmented write command includes a region identifier set by the hypervisor prior to issuing the command. The write command additionally includes a write address (e.g., LSA) and data to write. The write command may be received over a local interconnect (e.g., PCIe) or a network interface.

In step 404, the method identifies a region from the write command.

In one embodiment, the method extracts a region identifier from the augmented write command. For example, the method may analyze a configuration section of the command to identify the region identifier. The method may validate that the region identifier is valid (i.e., is within a range of valid identifiers or is properly formatted) prior to proceeding.

Next, the method queries a region configuration table (e.g., 108) to identify a range of physical addresses. As described above, a memory device may store a region configuration table (e.g., 108) that maps region identifiers to start and, in some embodiments, stop addresses of memory regions. In other embodiments, the region configuration table (e.g., 108) stores a mapping of region identifiers to start addresses and address space sizes.

In step 406, the method performs physical address lookup and wear leveling on the region.

After identifying the physical address range in step 404, the method selects a physical address to map with the write address and write the data. In a first embodiment, the method selects a randomly physical address that is not in use in the range for the region. However, in other embodiments, the method performs wear-leveling on the region to prevent corruption of cells and distribute operations across the region.

The method may use dynamic wear-leveling or static wear-leveling, scoped to a specific region and not the entire physical address space. Depending on the wear-leveling method used, the method typically either writes to an available erased block with the lowest erase count (dynamic wear leveling); or selects an available target block with the lowest overall erase count, erases the block if necessary, writes new data to the block, and ensures that blocks of static data are moved when their block erase count is below a certain threshold (static wear leveling).

In a dynamic wear leveling implementation, the method pools available blocks that are free of data and selects the block with the lowest erase count for the next write. This method is most efficient for dynamic data because only the non-static portion of the NAND Flash array is wear-leveled. A system that implements dynamic wear leveling enables longer NAND Flash device life than a system that does not implement wear leveling.

In a static wear leveling implementation, the method utilizes all good blocks to evenly distribute wear, providing effective wear leveling and thereby extending the life of the device. This method tracks the cycle count of all good blocks and attempts to evenly distribute block wear throughout the entire device by selecting the available block with the least wear each time a program operation is executed. Static data is managed by maintaining all blocks within a certain erase count threshold. Blocks that contain static data with erase counts that begin to lag behind other blocks will be included in the wear-leveling block pool, with the static data being moved to blocks with higher erase counts.

Notably, either or any wear leveling algorithm may be used. However, the method explicitly scopes wear leveling to a region and not to a global address space. Thus, data for a region (and thus VM(s)) is distributed among a region and not an entire device.

In step 408, the method writes the data to the physical address identified in step 406. In the illustrated embodiment, after identifying a physical address, the method writes the data to the physical address. Any techniques for writing data to a memory array may be used after identifying the physical address as described above.

Figure 5:
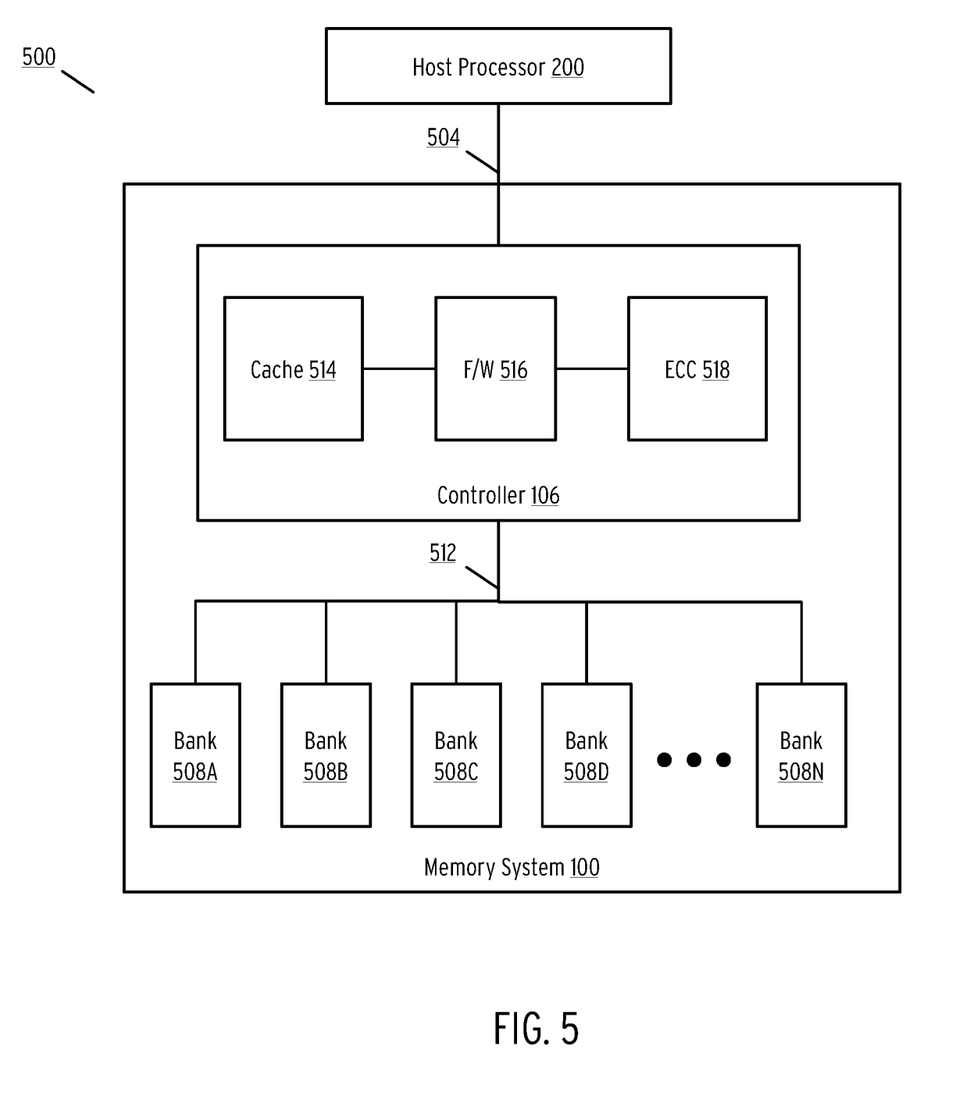
FIG. 5 is a block diagram illustrating a memory system according to some embodiments of the disclosure.

FIG. 5 is a block diagram illustrating a memory system according to some embodiments of the disclosure.

As illustrated in FIG. 5, a computing system (500) includes a processor (200) communicatively coupled to a memory system (100) via a bus (504). The memory system (100) comprises a controller (106) communicatively coupled to one or more memory banks (508a-508n) forming a memory array (104) via a bus/interface (512). As illustrated, the controller (106) includes a local cache (514), firmware (516), and an ECC module (520).

In the illustrated embodiment, processor (200) can comprise any type of computer processor, such as a central processing unit (CPU), graphics processing unit (GPU), or other types of general-purpose or special-purpose computing devices. Processor (200) includes one or more output ports that allow for the transmission of address, user, and control data between the processor (200) and the memory system (100). In the illustrated embodiment, this communication is performed over the bus (504). In one embodiment, the bus (504) comprises an input/output (I/O) bus or a similar type of bus.

The memory system (100) is responsible for managing one or more memory banks (508a-508n). In one embodiment, the banks (508a-508n) comprise NAND Flash dies or other configurations of non-volatile memory. In one embodiment, the memory banks (508a-508n) comprise a memory array such as memory array (104).

The banks (508a-508n) are managed by the controller (106). In some embodiments, the controller (106) comprises a computing device configured to mediate access to and from banks (508a-508n). In one embodiment, the controller (106) comprises an ASIC or other circuitry installed on a printed circuit board housing the banks (508a-508n). In some embodiments, the controller (106) may be physically separate from the banks (508a-508n). The controller (106) communicates with the banks (508a-508n) over the interface (512). In some embodiments, this interface (512) comprises a physically wired (e.g., traced) interface. In other embodiments, the interface (512) comprises a standard bus for communicating with banks (508a-508n).

The controller (106) comprises various modules (514-518). In one embodiment, the various modules (514-518) comprise various physically distinct modules or circuits. In other embodiments, the modules (514-518) may completely (or partially) be implemented in software or firmware.

As illustrated, firmware (516) comprises the core of the controller and manages all operations of the controller (106). The firmware (516) may implement some or all of the methods described above. Specifically, the firmware (516) may implement the methods described in FIGS. 1 and 4.

Figure 6:
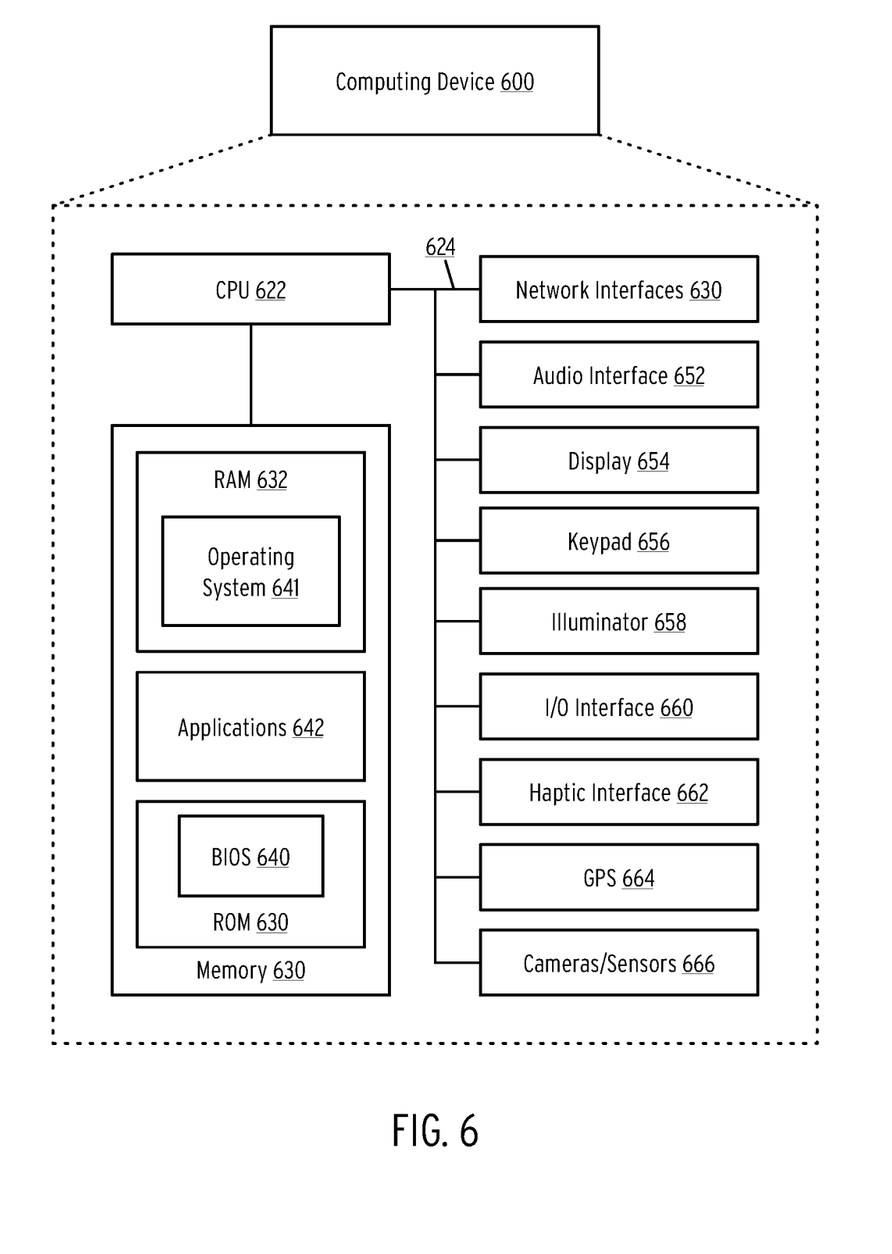
FIG. 6 is a block diagram illustrating a computing device showing an example embodiment of a computing device used in the various embodiments of the disclosure.

FIG. 6 is a block diagram illustrating a computing device showing an example embodiment of a computing device used in the various embodiments of the disclosure.

The computing device (600) may include more or fewer components than those shown in FIG. 6. For example, a server computing device may not include audio interfaces, displays, keypads, illuminators, haptic interfaces, GPS receivers, cameras, or sensors.

As shown in the figure, the device (600) includes a processing unit (CPU) (622) in communication with a mass memory (630) via a bus (624). The computing device (600)

also includes one or more network interfaces (650), an audio interface (652), a display (654), a keypad (656), an illuminator (658), an input/output interface (660), a haptic interface (662), an optional global positioning systems (GPS) receiver (664) and a camera(s) or other optical, thermal, or electromagnetic sensors (666). Device (600) can include one camera/sensor (666), or a plurality of cameras/sensors (666), as understood by those of skill in the art. The positioning of the camera(s)/sensor(s) (666) on the device (600) can change per device (600) model, per device (600) capabilities, and the like, or some combination thereof.

The computing device (600) may optionally communicate with a base station (not shown) or directly with another computing device. Network interface (650) is sometimes known as a transceiver, transceiving device, or network interface card (NIC).

The audio interface (652) produces and receives audio signals such as the sound of a human voice. For example, the audio interface (652) may be coupled to a speaker and microphone (not shown) to enable telecommunication with others or generate an audio acknowledgment for some action. Display (654) may be a liquid crystal display (LCD), gas plasma, light-emitting diode (LED), or any other type of display used with a computing device. Display (654) may also include a touch-sensitive screen arranged to receive input from an object such as a stylus or a digit from a human hand.

Keypad (656) may comprise any input device arranged to receive input from a user. Illuminator (658) may provide a status indication or provide light.

The computing device (600) also comprises input/output interface (660) for communicating with external devices, using communication technologies, such as USB, infrared, Bluetooth™, or the like. The haptic interface (662) provides tactile feedback to a user of the client device.

The optional GPS transceiver (664) can determine the physical coordinates of the computing device (600) on the surface of the Earth, which typically outputs a location as latitude and longitude values. GPS transceiver (664) can also employ other geo-positioning mechanisms, including, but not limited to, triangulation, assisted GPS (AGPS), E-OTD, CI, SAI, ETA, BSS, or the like, to further determine the physical location of the computing device (600) on the surface of the Earth. In one embodiment, however, the computing device (600) may, through other components, provide other information that may be employed to determine a physical location of the device, including, for example, a MAC address, Internet Protocol (IP) address, or the like.

Mass memory (630) includes a RAM (632), a ROM (634), and other storage means. Mass memory (630) illustrates another example of computer storage media for storage of information such as computer-readable instructions, data structures, program modules, or other data. Mass memory (630) stores a basic input/output system ("BIOS") (640) for controlling the low-level operation of the computing device (600). The mass memory also stores an operating system (641) for controlling the operation of the computing device (600)

Applications (642) may include computer-executable instructions which, when executed by the computing device (600), perform any of the methods (or portions of the methods) described previously in the description of the preceding Figures. In some embodiments, the software or programs implementing the method embodiments can be read from hard disk drive (not illustrated) and temporarily stored in RAM (632) by CPU (622). CPU (622) may then read the software or data from RAM (632), process them, and store them to RAM (632) again.

The disclosure includes various devices which perform the methods and implement the systems described above, including data processing systems which perform these methods, and computer-readable media containing instructions which, when executed on data processing systems, cause the systems to perform these methods.

The description and drawings are illustrative and are not to be construed as limiting. Numerous specific details are described to provide a thorough understanding. However, in certain instances, well-known or conventional details are not described in order to avoid obscuring the description. References to "one" or "an" embodiment in the present disclosure do not necessarily reference the same embodiment; and, such references mean at least one.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described, which may be requirements for some embodiments, but not other embodiments.

In this description, various functions and operations may be described as being performed by or caused by software code to simplify description. However, those skilled in the art will recognize what is meant by such expressions is that the functions result from the execution of the code by one or more processors, such as a microprocessor, Application-Specific Integrated Circuit (ASIC), graphics processor, or a Field-Programmable Gate Array (FPGA). Alternatively, or in combination, the functions and operations can be implemented using special-purpose circuitry (e.g., logic circuitry), with or without software instructions. Embodiments can be implemented using hardwired circuitry without software instructions or in combination with software instructions. Thus, the techniques are not limited to any specific combination of hardware circuitry and software, nor to any particular source for the instructions executed by a computing device.

While some embodiments can be implemented in fully functioning computers and computer systems, various embodiments are capable of being distributed as a computing product in a variety of forms and are capable of being applied regardless of the particular type of machine or computer-readable media used to effect distribution.

At least some aspects disclosed can be embodied, at least in part, in software. That is, the techniques may be carried out in a computing device or other system in response to its processor, such as a microprocessor, executing sequences of instructions contained in a memory, such as ROM, volatile RAM, non-volatile memory, cache, or a remote storage device.

Routines executed to implement the embodiments may be implemented as part of an operating system, middleware, service delivery platform, SDK (Software Development Kit) component, web services, or other specific application, component, program, object, module, or sequence of instructions referred to as "computer programs." Invocation interfaces to these routines can be exposed to a software development community as an API (Application Programming Interface). The computer programs typically comprise one or more instructions set at various times in various memory and storage devices in a computer, and that, when read and executed by one or more processors in a computer, cause the computer to perform operations necessary to execute elements involving the various aspects.

A machine-readable medium can be used to store software and data which, when executed by a computing device, causes the device to perform various methods. The executable software and data may be stored in various places, including, for example, ROM, volatile RAM, non-volatile memory, or cache. Portions of this software or data may be stored in any one of these storage devices. Further, the data and instructions can be obtained from centralized servers or peer to peer networks. Different portions of the data and instructions can be obtained from different centralized servers or peer to peer networks at different times and in different communication sessions or in the same communication session. The data and instructions can be obtained in entirety prior to the execution of the applications. Alternatively, portions of the data and instructions can be obtained dynamically, just in time, when needed for execution. Thus, it is not required that the data and instructions be on a machine-readable medium in entirety at a particular instance of time.

Examples of computer-readable media include but are not limited to recordable and non-recordable type media such as volatile and non-volatile memory devices, read-only memory (ROM), random access memory (RAM), flash memory devices, solid-state drive storage media, removable disks, magnetic disk storage media, optical storage media (e.g., Compact Disk Read-Only Memory (CD ROMs), Digital Versatile Disks (DVDs), etc.), among others. The computer-readable media may store the instructions.

In general, a tangible or non-transitory machine-readable medium includes any mechanism that provides (e.g., stores) information in a form accessible by a machine (e.g., a computer, mobile device, network device, personal digital assistant, manufacturing tool, any device with a set of one or more processors, etc.).

In various embodiments, hardwired circuitry may be used in combination with software and firmware instructions to implement the techniques. Thus, the techniques are neither limited to any specific combination of hardware circuitry and software nor to any particular source for the instructions executed by a computing device.

Various embodiments set forth herein can be implemented using a wide variety of different types of computing devices. As used herein, examples of a "computing device" include, but are not limited to, a server, a centralized computing platform, a system of multiple computing processors or mobile devices, a user terminal, a vehicle, a personal communications device, a wearable digital device, an electronic kiosk, a general-purpose computer, an electronic document reader, a tablet, a laptop computer, a smartphone, a digital camera, a residential, domestic appliance, a television, or a digital music player. Additional examples of computing devices include devices that are part of what is called "the internet of things" (IoT). Such "things" may have occasional interactions with their owners or administrators, who may monitor the things or modify settings on these things. In some cases, such owners or administrators play the role of users with respect to the "thing" devices. In some examples, the primary mobile device (e.g., an Apple iPhone) of a user may be an administrator server with respect to a paired "thing" device that is worn by the user (e.g., an Apple watch).

In some embodiments, the computing device can be a computer or host system, which is implemented, for example, as a desktop computer, laptop computer, network server, mobile device, or another computing device that includes a memory and a processing device. The host system can include or be coupled to a memory subsystem so that the host system can read data from or write data to the memory subsystem. The host system can be coupled to the memory subsystem via a physical host interface. In general, the host system can access multiple memory subsystems via the same communication connection, multiple separate communication connections, and/or a combination of communication connections.

In some embodiments, the computing device is a system including one or more processing devices. Examples of the processing device can include a microcontroller, a central processing unit (CPU), special purpose logic circuitry (e.g., a field-programmable gate array (FPGA), an application-specific integrated circuit (ASIC), etc.), a system on a chip (SoC), or another suitable processor.

Although some of the drawings illustrate a number of operations in a particular order, operations which are not order-dependent may be reordered, and other operations may be combined or broken out. While some reordering or other groupings are specifically mentioned, others will be apparent to those of ordinary skill in the art and so do not present an exhaustive list of alternatives. Moreover, it should be recognized that the stages could be implemented in hardware, firmware, software, or any combination thereof.

In the foregoing specification, the disclosure has been described with reference to specific exemplary embodiments thereof. It will be evident that various modifications may be made thereto without departing from the broader spirit and scope as set forth in the following claims. The specification and drawings are, accordingly, to be regarded in an illustrative sense rather than a restrictive sense.

What is claimed is:

1. A system comprising:
a host processor and a memory device, wherein:
the host processor is configured to receive a write command from a virtual machine, augment the write command with a region identifier, and issue the write command to the memory device, and
the memory device is configured to identify a region of a storage array using a region configuration table and write data to an address in the region.

2. The system of claim 1, wherein host processor comprises a hypervisor.

3. The system of claim 1, wherein the memory device comprises a solid-state device (SSD).

4. The system of claim 3, the memory device further comprising a NAND Flash memory array.

5. The system of claim 1, wherein the host processor maps a plurality of virtual machines to a plurality of corresponding region identifiers, wherein at least two of the plurality of virtual machines are mapped to a same region identifier.

6. The system of claim 1, wherein the host processor maps a plurality of virtual machines to a plurality of unique corresponding region identifiers.

7. The system of claim 1, wherein the host processor is configured to augment the write command with the region identifier by inserting the region identifier into a configuration section of the write command.

8. The system of claim 1, wherein the host processor is configured to issue the write command to the memory device by issuing the write command over a Peripheral Component Interconnect Express (PCIe) bus.

9. The system of claim 1, wherein the host processor is configured to issue the write command to the memory device by issuing the write command over a network.

10. The system of claim 1, wherein the host processor is configured to generate a manage a set of region identifiers based on a capacity of the memory device, wherein the host processor is configured to transmit the set of region identifiers to the memory device.

11. The system of claim 10, wherein the memory device is configured to initialize a region configuration table in response to receiving the set of region identifiers.

12. The system of claim 1, wherein the memory device is configured to map a physical address in the region to the write command.

13. The system of claim 12, wherein the memory device is configured to perform wear-leveling on the region prior to mapping the physical address to the write command.

14. A method comprising:
receiving a write command from a virtual machine (VM);
identifying a region identifier associated with the VM, via a table;
augmenting the write command with the region identifier; and
issuing the write command to a memory device.

15. The method of claim 14, further comprising:
dividing available addresses of the memory device into a plurality of regions;
assigning the plurality of regions to a plurality of region identifiers; and
transmitting the plurality of region identifiers to the memory device.

16. The method of claim 14, further comprising assigning a VM to a region identifier in response to an instantiation of the VM.

17. The method of claim 14, wherein augmenting the write command with the region identifier comprises inserting the region identifier into a configuration section of the write command.

18. A method comprising:
receiving an augmented write command from a host processor, the augmented write command including a region identifier;
identifying a set of physical addresses;
mapping a write address to a physical address in the set of physical addresses associated with the region identifier; and
writing data to the physical address.

19. The method of claim 18, further comprising performing wear-leveling on the set of physical addresses prior to mapping the physical address.

20. The method of claim 18, further comprising initializing a region configuration table based on a set of region identifiers received from the host processor.

* * * * *